United States Patent [19]

Scheps

[11] Patent Number: 5,090,019
[45] Date of Patent: Feb. 18, 1992

[54] LASER DIODE-PUMPED TUNABLE SOLID STATE LASER

[75] Inventor: Richard Scheps, Del Mar, Calif.

[73] Assignee: The United States of America as represented by the Secretary of the Navy, Washington, D.C.

[21] Appl. No.: 639,645

[22] Filed: Jan. 10, 1991

[51] Int. Cl.$^5$ .................................... H01S 3/14
[52] U.S. Cl. ........................ 372/39; 372/27; 372/97; 372/99; 372/69
[58] Field of Search ............. 372/97, 92, 99, 72, 372/27

[56] References Cited

U.S. PATENT DOCUMENTS

| | | | |
|---|---|---|---|
| 3,997,853 | 12/1976 | Morris et al. | 372/41 |
| 4,464,759 | 8/1984 | Haus et al. | 372/97 |
| 4,653,056 | 3/1987 | Baer et al. | 372/71 |
| 4,748,632 | 5/1988 | Preston | 372/97 |
| 4,791,927 | 12/1988 | Menger | 128/303.1 |
| 4,794,615 | 12/1988 | Berger | 372/69 |
| 4,809,283 | 2/1989 | Harter | 372/41 |
| 4,811,349 | 3/1989 | Payne et al. | 372/41 |
| 4,852,567 | 8/1989 | Sinofsky | 128/303.1 |
| 4,884,281 | 11/1989 | Hawthorn et al. | 372/75 |
| 4,901,330 | 2/1990 | Wolfram | 372/75 |
| 4,922,502 | 5/1990 | Unternahrer et al. | 372/66 |
| 4,942,582 | 7/1990 | Kintz et al. | 372/41 |

OTHER PUBLICATIONS

Scheps, Richard et al, "Laser Diode-Pumped Tunable Solid State Laser", *Proceedings Reprint*, SPIE, vol. 1223, pp. 189-195, 15-17 Jan. 1990.

Scheps, Richard et al, "Alexandrite Laser Pumped by Semiconductor Lasers", *Appl. Phys. Lett.*, 56, 4 Jun. 1990.

Scheps, R., "Efficient Laser Diode Pumped Nd Lasers", *Appl. Opt.* 28, pp. 89-91, Jan. 1989.

Walling, J. C. et al, "Tunable Alexandrite Lasers", *IEEE J. Quant. Electron*, QE-16, pp. 1302-1315, Dec. 1980.

Kumagi, O. et al, "680 nm AlGaInP Visible Lasers Grown by MOCVD", *Proceedings of the SPIE*, L. E. Cramer et al editors, vol. 898, pp. 80-83, SPIE Billingham, 1988.

Findlay, D. et al, "The Measurement of Internal Losses in Four-Level Lasers", *Phys. Lett.* 20, pp. 277-278, Feb. 1966.

Koechner, W., *Solid-State Laser Engineering*, pp. 1-122, Springer-Verlag, New York, 1976.

*Primary Examiner*—Leon Scott, Jr.
*Attorney, Agent, or Firm*—Harvey Fendelman; Thomas Glenn Keough

[57] ABSTRACT

A low threshold resonator for an alexandrite laser receives a 680 nm pumping beam from at least one laser pump to provide alexandrite laser emission at around 751 nm. An alexandrite crystal or rod receives the 680 nm beam and has an exterior face provided with a dichroic coating highly transmissive to the 680 nm beam and highly reflective to the 751 nm emission and has an interior face provided with an AR coating antireflective to the 751 nm emission. A mirror, provided with a HR coating that is highly reflective to the 751 nm emission, has an appropriate radius of curvature and is appropriately spaced from the exterior face of the alexandrite rod to focus reflected 751 nm emission in a resonator mode on the exterior face of the alexandrite rod to assure low threshold pumping thereof. The mirror has a radius of curvature which is the same as the spacing between the exterior face of the alexandrite rod and the mirror to focus the reflected emission in the resonator mode in a spot size on the exterior face. A lens is disposed to receive the pumping beam to focus it on the spot size on the exterior face of the alexandrite rod. The lens, the alexandrite rod and the mirror are appropriately configured and predeterminably spaced with respect to each other to assure that mode matching of the lens expands at exactly the same rate as the resonator mode to assure low threshold pumping thereof.

12 Claims, 3 Drawing Sheets

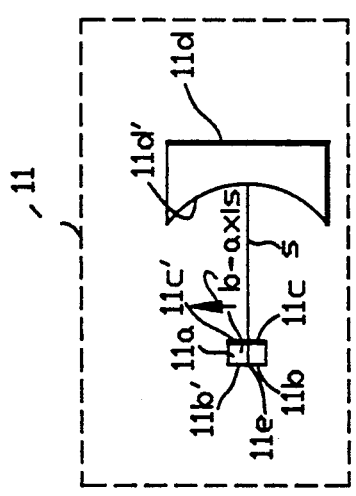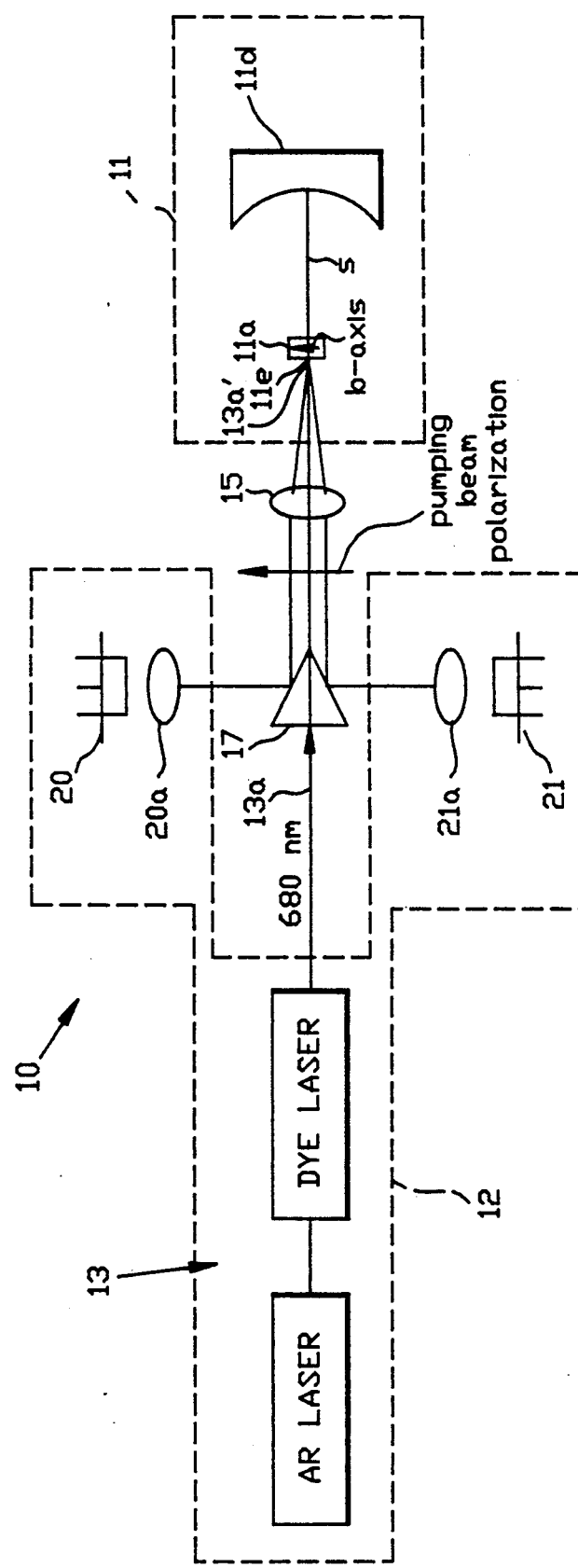

LASER DIODE-PUMPED TUNABLE SOLID STATE LASER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Longitudinal pumping of Nd:YAG by laser diodes is well established, producing excellent performance in terms of power and efficiency, see the article by R. Scheps, entitled "Efficient Laser Diode Pumped Nd Lasers," *Appl. Opt.* 28, pp. 89–91, January 1989. Alexandrite, which is chromium-doped chrysoberyl (Cr:BeAl$_2$O$_4$) is a tunable visible laser that operates between 700 and 820 nm and would be ideally suited for a number of applications if appropriate efficiency could be demonstrated, note the article by J. C. Walling et al. entitled "Tunable Alexandrite Lasers," *IEEE J. Quant. Electron.* OE-16, pp. 1302–1315, December 1980. With the recent introduction of commercial 5 mW laser diodes operating in the 670–680 nm range, diode pumping of alexandrite is now possible but requires combining the output of several such devices. Higher power visible diodes are reported by O. Kumagai et al. in their article, "680 nm AlGaInP Visible Lasers Grown by MOCVD," *Proceedings of the SPIE*, L. E. Cramer et al. editors, Vol. 898, pp. 80–83, SPIE Bellingham, 1988.

Thus, a continuing need exists in the state of the art for an operational low threshold direct-diode pumped tunable chromium-doped solid state laser that is practical and efficient when pumped with sufficient optical power.

SUMMARY OF THE INVENTION

A low threshold resonator for an alexandrite laser receives a pumping beam from at least one pumping diode to provide alexandrite laser emission. An alexandrite rod is disposed to receive the pumping beam and has an exterior face provided with a dichroic coating highly transmissive to the pumping beam and highly reflective to the alexandrite rod emission and has an interior face provided with an AR coating antireflective to the alexandrite rod emission. A mirror, provided with a HR coating that is highly reflective to the alexandrite rod emission, has an appropriate radius of curvature and is appropriately spaced from the interior face of the alexandrite rod to focus reflected alexandrite rod emission in a resonator mode on the exterior face of the alexandrite rod to assure low threshold pumping thereof. The mirror has a radius of curvature which is the same dimension as the spacing between the exterior face of the alexandrite rod and the mirror to focus the reflected emission in the resonator mode in a spot size on the exterior face. A lens is disposed to receive the pumping beam to focus it on the spot size on the exterior face of the alexandrite rod. The lens, the alexandrite rod and the mirror are appropriately configured and predeterminably spaced with respect to each other to assure that mode matching of the lens expands at exactly the same rate as the resonator mode to assure low threshold pumping thereof.

An object of the invention is to provide a low threshold alexandrite laser.

An object of the invention is to provide a low threshold alexandrite laser operable between 700 and 820 nm.

Another object is to provide an alexandrite laser being sufficiently optically pumped at a relatively low threshold to provide for practicality and efficient operation.

Yet another object is to provide an alexandrite laser pumped by at least one laser diode of sufficient power to assure efficient operation thereof.

An object of the invention is to provide a low threshold alexandrite laser having a lens, alexandrite rod and mirror appropriately configured and predeterminably spaced with respect to each other to assure low threshold pumping thereof.

An object of the invention is to provide a low threshold alexandrite laser having a lens, alexandrite rod and mirror appropriately configured and predeterminably spaced with respect to each other that mode matching of the lens expands at exactly the same rate as the resonator mode to assure to assure low threshold pumping thereof.

These and other objects of the invention will become more readily apparent from the ensuing specification and drawings when taken in conjunction with the appended claims.

BRIEF DESCRIPTION OF THE DRAWINGS

FIG. 1 is a schematic diagram of the resonator geometry of the alexandrite laser.

FIG. 2 is a schematic diagram (top view) of the pump optics and resonator geometry.

DESCRIPTION OF THE PREFERRED EMBODIMENT

Figure 3:
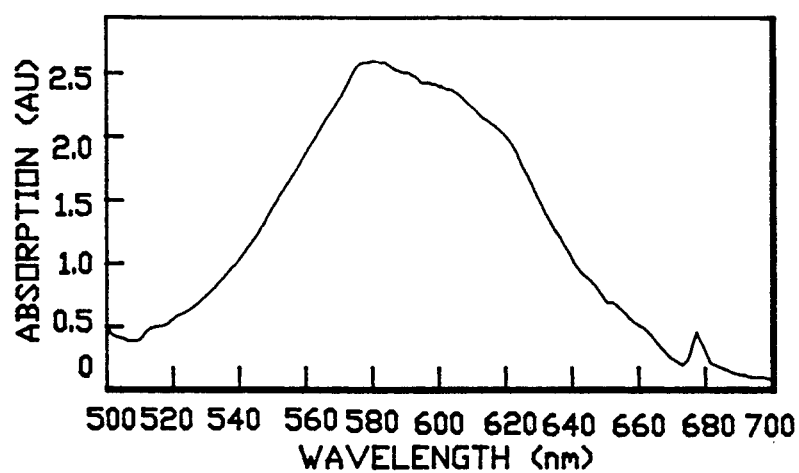
FIG. 3 depicts a low resolution absorption spectrum for the 5 mm long coated alexandrite laser rod measured with light polarized E ∥ b.

Looking now to FIG. 1 and FIG. 2 of the drawings, a low threshold resonator 11 of an alexandrite laser has an alexandrite rod 11a disposed to receive a focussed pumping beam 13a' via a lens 15. The pumping beam passes through an exterior face 11b that has been provided with a dichroic coating 11b' that is highly transmissive to the pumping beam and highly reflective to the alexandrite rod emission. Alexandrite rod 11a also has its interior face 11c provided with an AR coating 11c' that is antireflective to the alexandrite rod emission.

A mirror 11d has an HR coating 11d' that is highly reflective to the alexandrite rod emission, and is shaped with a predetermined radius of curvature, for example, a 5 cm radius of curvature. The HR coated surface 11d' of mirror 11d is appropriately separated or spaced a dimension s from exterior face 11b of alexandrite rod 11a, in this example, separated s=5 cm from the exterior face to focus reflected alexandrite rod emission in a resonator mode onto the exterior face of the alexandrite rod to assure low threshold pumping.

The radius of curvature and spacing are critical for the low threshold alexandrite emissions of this inventive concept so that the mirror is selected to have a radius of curvature which is the same as the spacing between the exterior face of the alexandrite rod and the mirror to focus the reflected emission in the resonator mode in a relatively small sized spot 11e on the exterior face.

Lens 15 is appropriately configured and disposed to receive the pumping beam to focus it on substantially the same spot 11e on exterior face 11b of the alexandrite rod. The lens, the alexandrite rod and the mirror are specifically tailored in accordance with capabilities known in the art and predeterminably spaced with respect to each other to assure that mode matching of the focused pumping beam is effected by the lens so that the pumping beam expands at exactly the same rate as the resonator mode to assure low threshold pumping thereof.

The diode-pumped tunable chromium-doped solid state laser 10 has low threshold alexandrite resonator 11 and pumping arrangement 12, arranged as depicted in FIG. 2. The pumping arrangement has an argon-ion pumped dye laser 13 operating at 680.4 nm to emit a beam 13a that provides the threshold power for low threshold resonator 11 and for defining the pumping axis. An elliptically-shaped spot 11e is the focused image of the dye laser beam on exterior face 11b of the alexandrite rod 11a and is dimensioned to measure 27 microns by 40 microns along its two axes and has a spectral bandwidth of 40 GHz. The dye laser beam is centered on focussing lens 15 and passes just above the top surface of a coupling prism 17 to assure that the appropriately dimensioned elliptical spot 11e is focused on exterior face 11b.

Two 680 nm laser diodes 20 and 21 are oriented to place their front facets perpendicular to dye laser axis (path of beam 13a) and the plane of the output polarization of both of the laser diodes is parallel to that of dye laser 13. Each diode emission is collimated and aligned such that upon reflection by prism 17 the propagation of each diode is parallel to dye laser beam 13a output of the dye laser.

When this alignment is achieved by dye laser 13 and laser diode 20 and 21, all three sources are focused, via lens 15 to a single spot 11e on exterior face 11b of the alexandrite rod 11a. Only two laser diodes are shown in this example. It is to be understood that more than two laser diodes can be geometrically coupled to the alexandrite laser rod resonator by modification of the existing pump configuration; however, the alignment tolerances are critical so that the addition of more laser diodes might overly complicate the resultant configuration (i.e. additional laser diodes may contribute significantly to overall operational complexity).

The alexandrite laser rod 11 is oriented so that the plane of polarization of the pump light is parallel to the b axis, E ∥ b. The polarization of the alexandrite laser emission is in this same plane. Interior face 11c of the rod was antireflection (AR) coated 11c' from 700 to 800 nm and exterior face 11b had a dichroic coating 11b' which was greater than 99.9% reflective from 757 to 773 nm, and highly transmissive at the 680 nm. The coating reflectivity at 751 nm was checked at both the rod and the HR coating 11d' on output coupler (mirror 11d) and was measured to be 99.78% and 99.97 percent, respectively.

Several different focusing lenses 15 and output couplers (mirror 11d) were used in an effort to reduce the laser threshold. The lowest threshold achieved was near 12 mW for a configuration consisting of 5 cm radius of curvature (ROC) output coupler (mirror 11d), a near-hemispherical resonator cavity and a mode matching focusing lens 15. The output coupler was a high reflector for the 680 nm pump light as well and this allowed unabsorbed pump radiation to make a second pass through alexandrite rod 11a. A high resolution video camera with a microscope objective lens was found useful for facilitating the alignment of the three beams, ensuring that they were coincident on spot 11e on exterior face 11b as well as overlapping to the greatest degree possible within the rod itself.

Figure 4:
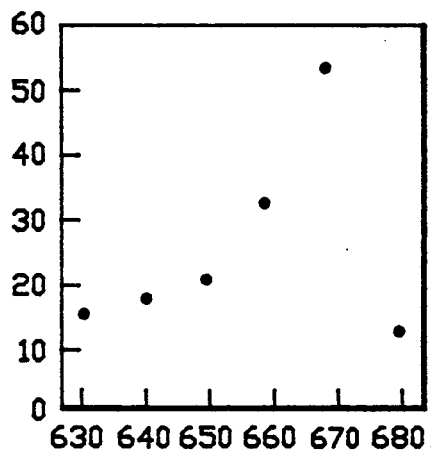
FIG. 4 depicts the pump laser threshold power as a function of pump wavelengths.

Validation of this inventive concept by the characterization of the alexandrite resonator for longitudinal pumping with 680 nm laser radiation and diode pumping of alexandrite has been demonstrated. Firstly, the alexandrite characterization at the 680 nm dye laser pumping is performed in low resolution, giving the absorption spectrum from 500 to 700 nm as shown in FIG. 3 for a 5 mm long alexandrite rod 11. Unresolved R lines are clearly seen at the 680 nm. The laser threshold as a function of dye laser wavelength is discernable by examination of FIG. 4 and is noted to correlate qualitatively with the absorption spectrum. The laser dynamics in alexandrite is approximated by a four-level system, and a Findlay-Clay analysis has been performed to measure the internal losses of the resonator, see the article by D. Findlay et al. entitled "The Measurement of Internal Losses in Four-Level Lasers," *Phys. Lett.* 20. pp. 277-278, February 1966.

Figure 5:
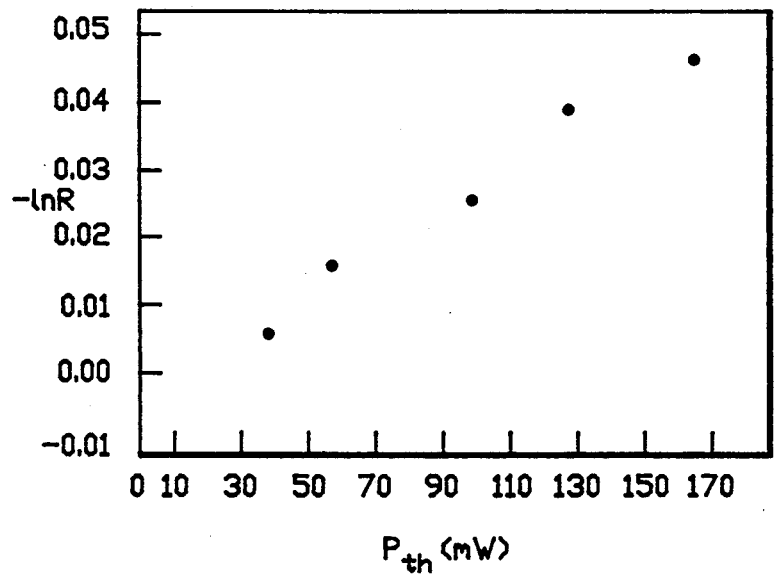
FIG. 5 depicts the variation of the pump laser threshold power with output coupler reflectivity (dots are data, line is linear regression fit).

The results of this approximation and analysis are set forth in FIG. 5. The data were fit by linear regression which showed a slope of $3.22 \times 10^{-4}$ mW$^{-1}$, an intercept of 0.0031, and a coefficient of determination of 0.99. The single path loss and small signal gain ($g_o l$) can be obtained from the fit parameters as given by W. Koechner in the text *Solid-State Laser Engineering*, pp. 1-122, Springer-Verlag, New York, 1976. As a consequence, the double pass loss and small signal gain are 0.31% and $1.6 \times 10^{-4}$ $P_{in}$ (mW$^{-1}$), respectively. As a point of reference, the values for these parameters measured four Nd:YAG were 0.09% and $3.85 \times 10^{-4}$ $P_{in}$ (mW$^{-1}$). The results of the coating reflectivity measurement cited above indicated that most of the loss is not distributed but is due to leakage of 750 nm radiation through the dichroic coatings on the rod.

Figure 6:
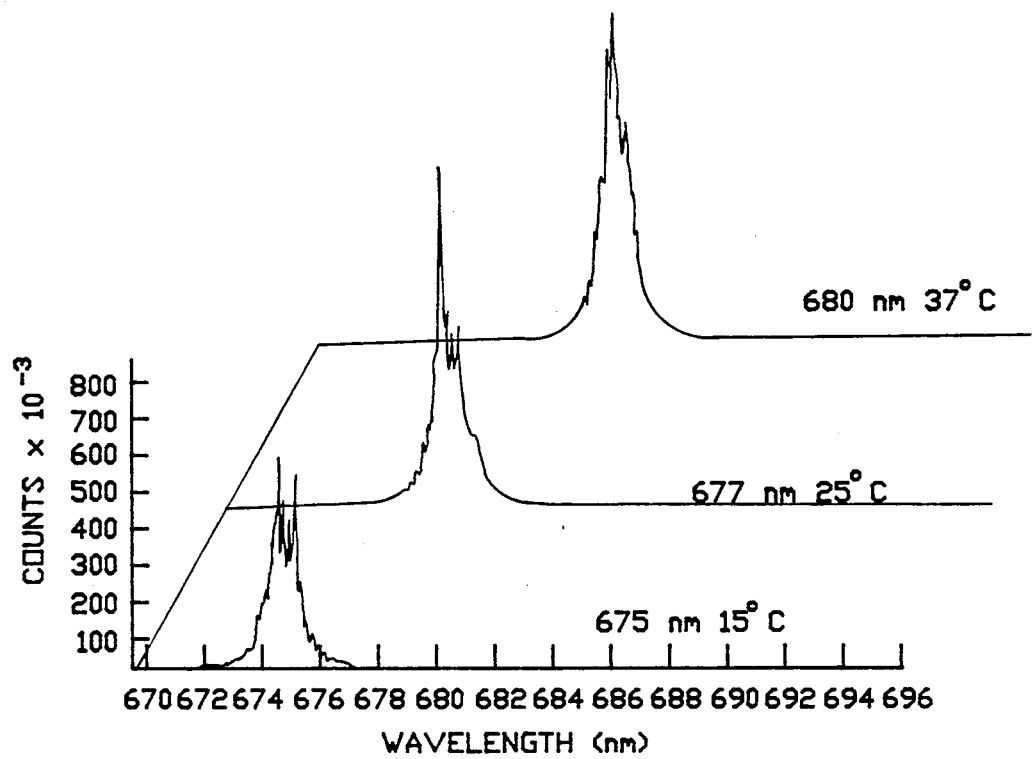
FIG. 6 is an OMA recording of the laser diode spectral output measured at three different temperatures. Temperature and central wavelengths are indicated for each trace.

The resonator characterization attributed to the laser diode pumping resulted from findings associated with the use of two 5 mW Sony AlGaInP laser diodes used to perform the diode pumping. The two laser diodes operated at 675 and 677 nm at 25° C. As a consequence, it was necessary to temperature tune their outputs to match the $R_1$ line wavelength. The diodes were found to be tuned on the average to 0.25 nm per centigrade degree and thus, both were operated near 40° C. The threshold current for the laser diodes at this operating temperature was 82 mA and the diode slope efficiency was 0.54 mW/mW. The slope efficiency improved as the temperature increased, and was 0.40 and 0.47 at 15° and 25° C., respectively. The farfield emission was measured for one of the laser diodes operating at 3 mW and showed FWHM divergence angles of 15° and 28° in the planes parallel and perpendicular to the junction, respectively. The spectral width of this laser diode was measured to be 0.75 nm at 680 nm and contained several longitudinal modes. An optical multi-channel analyzer (OMA) trace of the spectrum at three different temperatures is shown in FIG. 6. The focused spot size for the laser diode on the alexandrite rod was circular and measured 29 microns in diameter, which was a good match for the dye laser spot size of 27 microns by 40 microns. The optical transfer efficiency for laser diode output to the alexandrite rod was lower than achieved for diode pumped Nd:YAG, see the above referenced article by R. Scheps. The major loss was in collimating lens 20a or 21a where the best that could be obtained was 0.71. Coupling prism 17 reflected 92% of the polarized light incident upon it and the focusing lens 15 was measured to be 99% transmissive.

Two measurements were taken to characterize diode pumping of alexandrite. The first consisted of operating dye laser 13 at a power level just above threshold for the alexandrite laser rod 11a (in which case gain approximately equaled loss). Both laser diodes 20 and 21 were turned on and dye laser 13 power was backed off until the combined pump power level was enough to just exceed threshold once again. The reduced dye laser power was then measured. It was found that with diode pumping, the dye laser threshold pump power could be backed off an amount approximately equivalent to the laser diode power. Earlier characterization measurements on the laser diodes indicated that they could be overdriven for short periods of time to produce power in excess of their maximum readings. Due to the high slope efficiency at 40° C., only 5 mA of additional drive current was required for each laser diode to provide enough power to alexandrite rod 11a to exceed threshold with dye laser 13 off.

Figure 7:
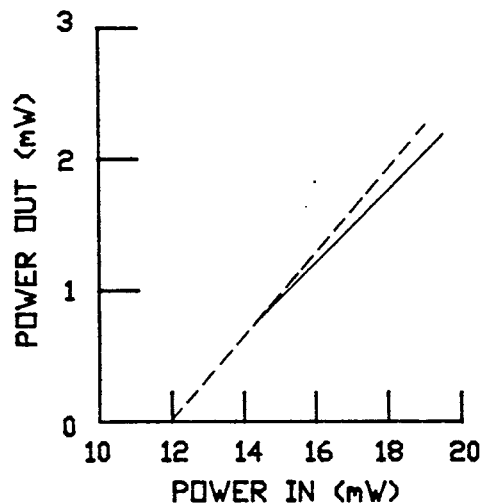
FIG. 7 is the slope efficiency for dye laser (dashed) and laser diode pumping of alexandrite (solid line).

The second measurement consisted of comparing the slope efficiency for pumping with dye laser 13 to the slope efficiency with pumping by laser diodes 20 and 21. The former slope efficiency was measured to be 29%. Because the diode power was only high enough to reach threshold, the slope efficiency for diode pumping was measured by using the dye laser to exceed threshold and then turning on the laser diodes. With the alexandrite laser producing an output power somewhat less than 1 mW, the addition of 5.5 mW of laser diode output produced an additional 1.4 mW of laser power, giving a slope efficiency of 25%. The lower slope efficiency for laser diode pumping compared to that for dye laser pumping is due to the width of the $R_1$ line (0.6 nm) relative to the bandwidth of the laser diode, and the imperfect geometrical overlap between the resonator mode (established by the dye laser pump fluence) and the inversion profile created by the laser diodes. The slope efficiencies are shown in FIG. 7. Slope efficiencies for diode pumping were measured with reflectivities of output coupler 11d of 99.97 percent, 99.60 percent, 99.25% and 98.25 percent. The best slope efficiency was obtained with the 99.25% output coupler which is a higher reflectivity than calculated optimum using the four-level system approximation (see the W. Koechner text cited above).

Figure 8:
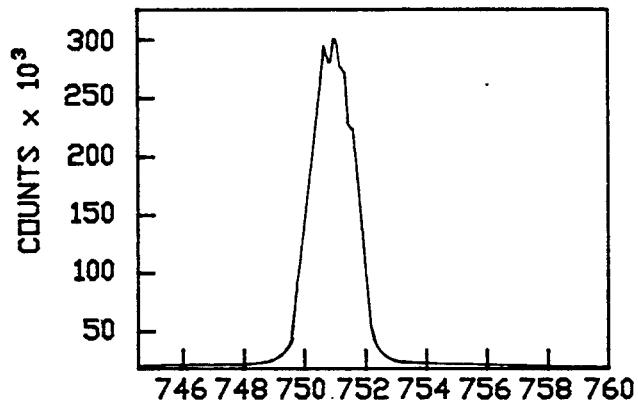
FIG. 8 is an OMA recording of the alexandrite lasing spectrum produced using two laser diodes to exceed threshold.

The broadband lasing spectrum of alexandrite pumped by the laser diodes is shown in FIG. 8. Virtually no difference is noted between this spectrum and that obtained by dye laser pumping alone, although as the pump power increased, the FWHM of the laser output increased from 2.1 nm near threshold to 3.1 nm at a pump power of approximately ten times threshold. The central wavelength for laser emission was 751 nm in either case.

The lasing characteristics of a lower threshold longitudinally pumped alexandrite laser have been measured at 680 nm with a dye laser. Pumping with laser diodes at 680 nm has led to additional characterization, and the slope efficiency using these diodes is noted to be similar to that obtained with the dye laser. The threshold power required for lasing was exceeded by overdriving two 5 mW laser diodes. On the basis of the results of this validation of this inventive concept, diode pumping of alexandrite is practical and efficient with greater improvements foreseeable as pump lasers having increased optical power.

Obviously, many other modifications and variations of the present invention are possible in the light of the above teachings. It is therefore to be understood that within the scope of the appended claims the invention may be practiced otherwise than as specifically described.

I claim:

1. A low threshold resonator for an alexandrite laser receiving a pumping beam from at least one pumping laser to provide alexandrite laser emission therefrom comprising:
    an alexandrite rod disposed to receive a polarized pumping beam in the range of 680 to 680.4 nm., said alexandrite rod is oriented so that the plane of polarization of said polarized pumping beam is parallel to its b axis, $E \parallel b$, where said b axis is a crystallographic axis in the alexandrite orthorhombic crystal structure of said alexandrite rod in which gain in the $E \parallel b$ polarization is 10 times that in alternate polarizations, said alexandrite rod having an exterior face provided with a dichroic coating highly transmissive to said polarized pumping beam and highly reflective to said alexandrite rod emission and said alexandrite rod having an interior face provided with an AR coating antireflective to said alexandrite rod emission and
    a mirror provided with a HR coating that is highly reflective to said alexandrite rod emission, said mirror having an appropriate radius of curvature and appropriately spaced from said exterior face of said alexandrite rod to focus said alexandrite rod emission in a spot on said exterior face of said alexandrite rod to assure low threshold pumping thereof.

2. An apparatus according to claim 1 in which said mirror has a radius of curvature which is the same as the spacing between said exterior face of said alexandrite rod and said mirror.

3. An apparatus according to claim 2 further including:
    a lens disposed to receive said pumping beam to focus it on said spot on said exterior face of said alexandrite rod and in a resonator mode in said alexandrite rod.

4. An apparatus according to claim 3 in which said lens, said alexandrite rod and said mirror are configured and predeterminably spaced with respect to each other to assure that mode matching of the focused said polarized pumping beam is effected by said lens so that said focused said polarized pumping beam expands at exactly the same rate as said resonator mode to assure low threshold pumping thereof.

5. A low threshold resonator for an alexandrite laser receiving a pumping beam from at least one pumping laser to provide alexandrite laser emission therefrom comprising:

an alexandrite rod disposed to receive a pumping beam, said alexandrite rod having an exterior face provided with a dichroic coating highly transmissive to said pumping beam and highly reflective to said alexandrite rod emission and said alexandrite rod having an interior face provided with an AR coating antireflective to said alexandrite rod emission;

a mirror provided with a HR coating that is highly reflective to said alexandrite rod emission, said mirror having an appropriate radius of curvature and appropriately spaced from said exterior face of said alexandrite rod to focus said alexandrite rod emission in a spot on said exterior face of said alexandrite rod and in a resonator mode in said alexandrite rod to assure low threshold pumping thereof, said mirror has a radius of curvature which is the same as the spacing between said exterior face of said alexandrite rod and said mirror; and a lens disposed to receive said pumping beam to focus it on said spot on said exterior face of said alexandrite rod and in said resonator mode in said alexandrite rod, said lens, said alexandrite rod and said mirror are configured and predeterminably spaced with respect to each other to assure that mode matching of the focused said pumping beam is effected by said lens so that said focused said pumping beam expands at exactly the same rate as said resonator mode to assure low threshold pumping thereof, said AR coating on said interior face of said alexandrite rod is antireflection from 700 to 800 nm and said dichroic coating is greater than 99.9% reflective from 757 to 773 nm and highly transmissive at 680 nm.

6. An apparatus according to claim 5 in which said pumping laser includes at least one laser diode emitting at 680 nm.

7. An apparatus according to claim 6 in which said laser diode is part of a pumping arrangement that also includes a dye laser operating at substantially 680 nm being focused on said spot on said exterior face of said alexandrite rod.

8. An apparatus according to claim 7 in which said pumping arrangement includes a pair of laser diodes emitting light to a coupling prism that directs said pumping beam onto said spot on said exterior face of said alexandrite rod to assure low threshold pumping thereof.

9. An apparatus according to claim 8 in which each of said pair of said laser diodes has a collimating lens interposed between it and said coupling prism and a focusing lens is interposed between said coupling prism and said alexandrite rod to assure the focusing of the radiated energy from said laser diodes on said spot on said exterior face of said alexandrite rod.

10. A method for pumping an alexandrite laser at a low threshold comprising:

providing a polarized pumping beam in the range of 680 to 680.4 nm. from at least one laser diode;

receiving said polarized pumping beam on an exterior face of an alexandrite rod, said alexandrite rod is oriented so that the plane of polarization of said polarized pumping beam is parallel to its b axis, $E \parallel b$, where said b axis is a crystallographic axis in the alexandrite orthorhombic crystal structure of said alexandrite rod in which gain in the $E \parallel b$ polarization is 10 times that in alternate polarizations, said alexandrite rod provided with a dichroic coating highly transmissive to said pumping beam and highly reflective to alexandrite rod emission and having an interior face provided with an AR coating antireflective to said alexandrite rod emission;

reflecting said alexandrite rod emission with a mirror provided with a HR coating to said alexandrite rod; and focusing said alexandrite rod emission with said mirror having an appropriate radius of curvature to focus said alexandrite rod emission in a spot on said exterior face of said alexandrite rod on said exterior face of said alexandrite rod to assure low threshold pumping thereof.

11. A method according to claim 10 further including:

spacing said exterior face of said alexandrite rod from said mirror to assure said focussing in said spot to assure low threshold pumping thereof.

12. A method according to claim 10 further including:

providing said mirror to have a radius of curvature which is the same dimension as the spacing between said exterior face of said alexandrite rod and said mirror to focus said alexandrite rod emission in said spot on said exterior face to assure low threshold pumping thereof.

* * * * *